O. FYLLING.
WHEEL ATTACHMENT FOR SLEDS.
APPLICATION FILED MAR. 5, 1909.

944,852.

Patented Dec. 28, 1909.
2 SHEETS—SHEET 1.

Witnesses
E. C. Cocker.
C. H. Griesbauer.

Inventor
Ole Fylling.
by H. B. Willson & Co.
Attorneys

O. FYLLING.
WHEEL ATTACHMENT FOR SLEDS.
APPLICATION FILED MAR. 5, 1909.
944,852.
Patented Dec. 28, 1909.
2 SHEETS—SHEET 2.
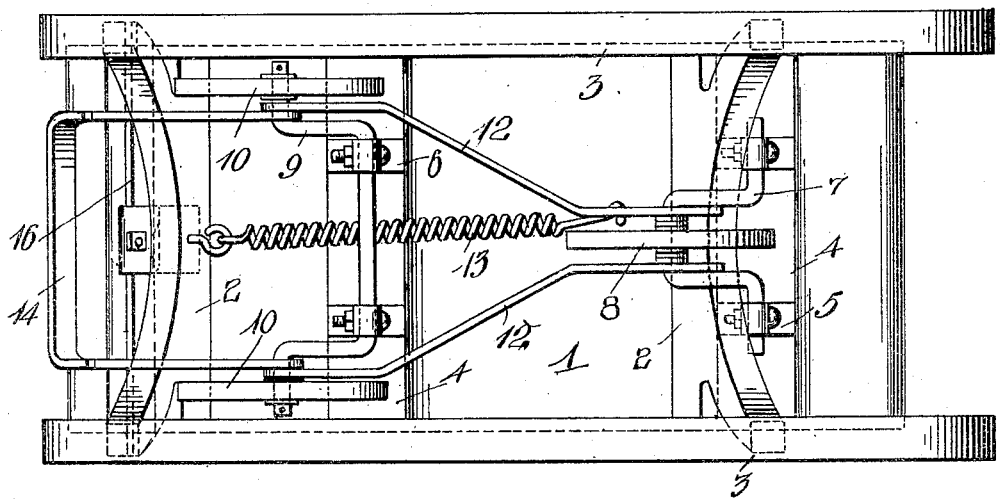
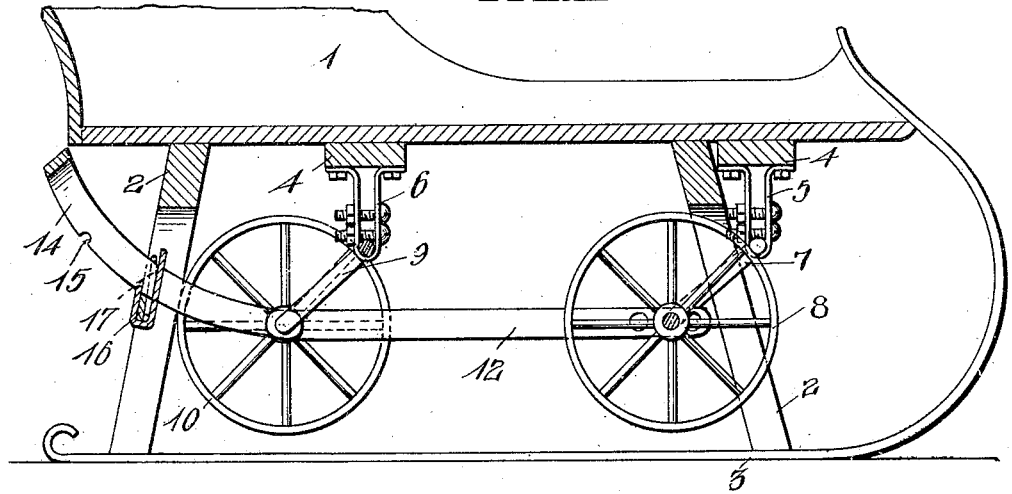
Witnesses
E. O. Crocker
C. H. Griesbauer
Inventor
Ole Fylling.
by H. B. Willson & Co.
Attorneys

UNITED STATES PATENT OFFICE.

OLE FYLLING, OF CROOKSTON, MINNESOTA.

WHEEL ATTACHMENT FOR SLEDS.

944,852.  Specification of Letters Patent. Patented Dec. 28, 1909.

Application filed March 5, 1909. Serial No. 481,265.

*To all whom it may concern:*

Be it known that I, OLE FYLLING, a citizen of the United States, residing at Crookston, in the county of Polk and State of Minnesota, have invented certain new and useful Improvements in Wheel Attachments for Sleds; and I do declare the following to be a full, clear, and exact description of the invention, such as will enable others skilled in the art to which it appertains to make and use the same.

This invention relates to improvements in wheel attachments for hand sleds and particularly for baby sleds or cutters.

The object of the invention is to provide an attachment of this character by means of which a hand sled or cutter may be quickly and easily supported on wheels and again changed to a sled when desired.

With the foregoing and other objects in view, the invention consists of certain novel features of construction, combination and arrangement of parts as will be more fully described and particularly pointed out in the appended claims.

Figure 1:
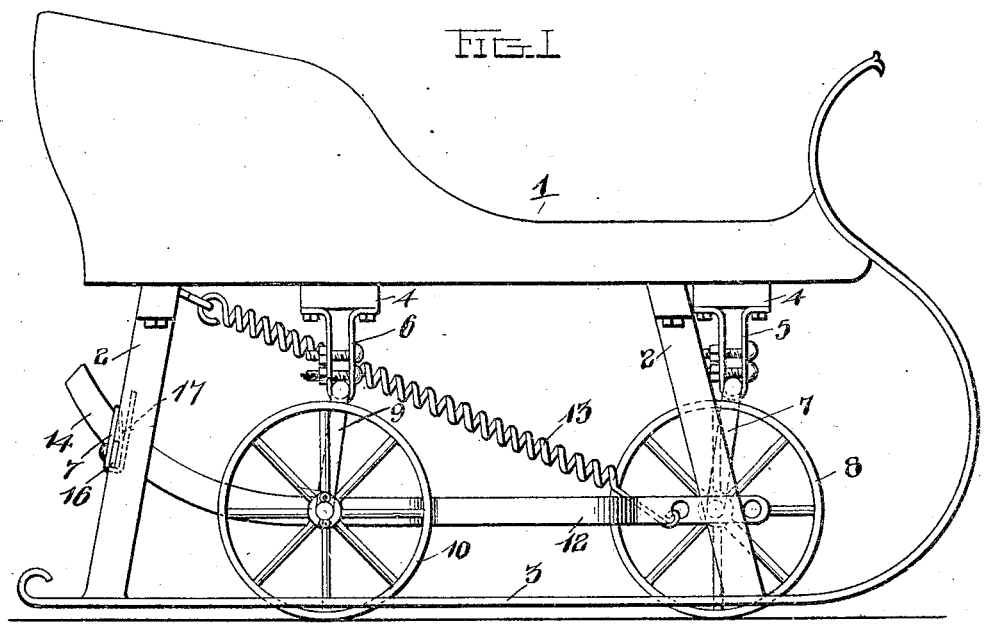
Figure 3:
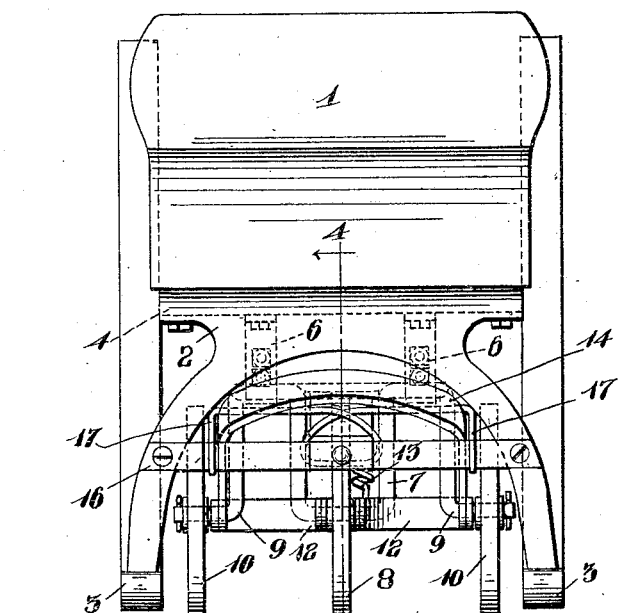

In the accompanying drawings, Figure 1 is a side view of a baby sled or cutter showing the invention applied thereto and in an operative position; Fig. 2 is a bottom plan view of the same, with the attachment in inoperative position; Fig. 3 is a rear view of the cutter with the parts arranged as shown in Fig. 1; and Fig. 4 is a longitudinal sectional view of the bottom portion of the cutter taken on line 4—4 of Fig. 3 showing the device in an inoperative position.

Referring more particularly to the drawings, 1 denotes the sled which is here shown in the form of a baby cutter. To the front and rear portions of the bottom of the cutter are secured the usual runner standards, 2, to the lower ends of which are secured runners, 3. To the under side of the bottom of the cutter are secured front and rear sills, 4, and to said sills are fastened front and rear pairs of hangers, 5 and 6. In the lower ends of the hangers are formed bearings in which are pivoted the wheel supporting shafts or axles.

In the front hangers, 5, is pivotally mounted a front crank shaft or axle, 7, on the crank portion of which is revolubly mounted a front supporting wheel, 8. In the rear hanger, 6, is pivotally mounted a crank shaft, 9, on the opposite crank ends of which are revolubly mounted rear supporting wheels, 10, said wheels being held in operative position by means of cotter pins or other suitable fastening devices.

The crank portions of the front and rear axles are connected together by longitudinally extended rearwardly diverging connecting bars or hounds, 12, whereby said axles are caused to move together or in unison. One of the hounds, 12, is connected by a stiff coiled spring, 13, to the rear portion of the under side of the cutter, whereby said axles and wheels are held up in an inoperative position beneath the bottom of the cutter. Pivotally connected to the rear axle, 9, is a bail shaped operating bar or handle, 14, which projects rearwardly and curves upwardly adjacent to the rear ends of the cutter body as shown. In the lower edges of the bar, 14, are formed locking notches, 15, which are adapted to be engaged with a locking bar, 16, projecting across and secured at its opposite ends to the rear runner standards, 2.

The operating bar or handle, 14, is held in frictional engagement with the locking bar, 16, by means of the spring, 17, which is secured to the locking bar, 16, at its center and opposite ends as shown. By means of the spring, 17, the locking notches, 15, in the operating bar, 14, will be forced into engagement with the locking bar when brought into alinement therewith, by the movement of the operating bar or handle, and when the notches are thus engaged with the locking bar, the handle and the wheel attachment will be rigidly held in an operative position to support the cutter on the wheels.

In the operation of the device when it is desired to support the cutter on the wheels, the handle is pushed downwardly and forwardly thus forcing the front and rear axles downwardly and forwardly against the tension of the spring, 13, until said axles or shafts are in vertical position at which time the notches in the handle of the operating bar will be caught into engagement with the locking bar as hereinbefore described, thus holding the wheels in an operative position. When it is desired to again support the cutter on its runners, the handle bar is released from its locked position with the locking bar, 16, at which time the spring, 13, will retract the axles rearwardly and upwardly, thus lifting the wheels out of engagement with the ground and allowing the runners to support the cutter.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:—

1. In a combined sleigh and carriage the combination with a body, of runner supporting standards fixed to the lower face at the front and rear of said body, front and rear crank axles pivotally mounted on the under side of said body, wheels revoluble on the crank portions of said axles, hounds connecting the cranks of said axles together, a locking bar, a bail shaped operating handle connected at its ends to the crank ends of said rear axle and provided with notches for engagement with said locking bar, resilient means for holding said handle and bar in locked position, and means for holding said wheels in inoperative position.

2. In a sled of the class described, runner supporting standards, runners secured to said standards, front and rear hangers secured to the bottom of the sled, front and rear wheel supporting crank axles pivotally mounted in said hangers, supporting wheels revolubly mounted on the cranks of said axles, hounds connecting the cranks of said axles together to cause them to move in unison, an operating handle connected to the rear axle and having locking notches, a locking bar, a spring adapted to hold said handle in frictional engagement with said locking bar and to engage the notches in said handle with said bar to hold the wheels in operative position and a spring adapted to retract said wheels to hold them in inoperative position.

In testimony whereof I have hereunto set my hand in presence of two subscribing witnesses.

OLE FYLLING.

Witnesses:
C. M. ANDERSON,
CORA M. PAULSON.